Dec. 2, 1941.　　　　E. F. FLINT　　　　2,264,835
MICROSCOPE
Filed July 30, 1940　　　3 Sheets-Sheet 1

EDWARD F. FLINT
INVENTOR

BY
ATTORNEYS

Dec. 2, 1941.   E. F. FLINT   2,264,835
MICROSCOPE
Filed July 30, 1940   3 Sheets-Sheet 2
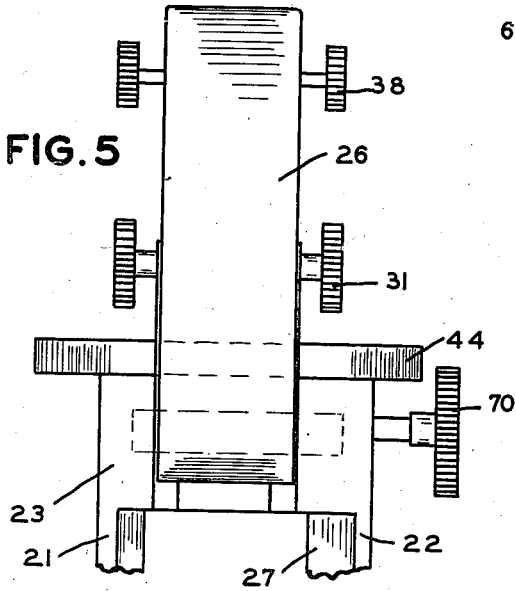
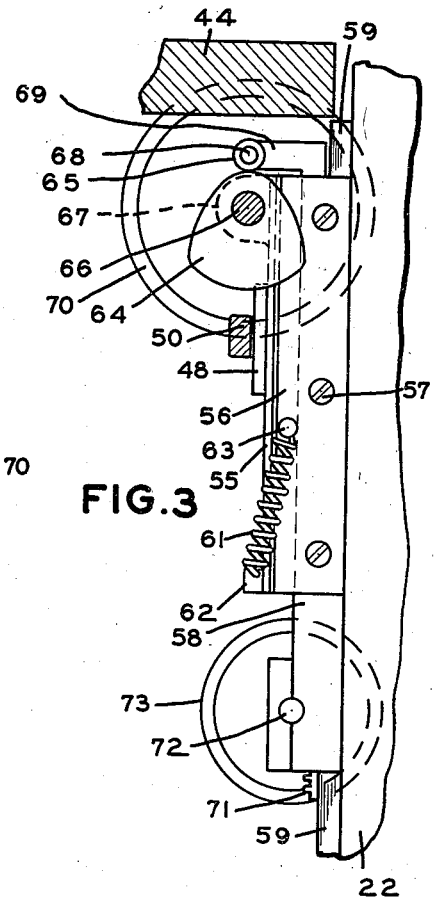
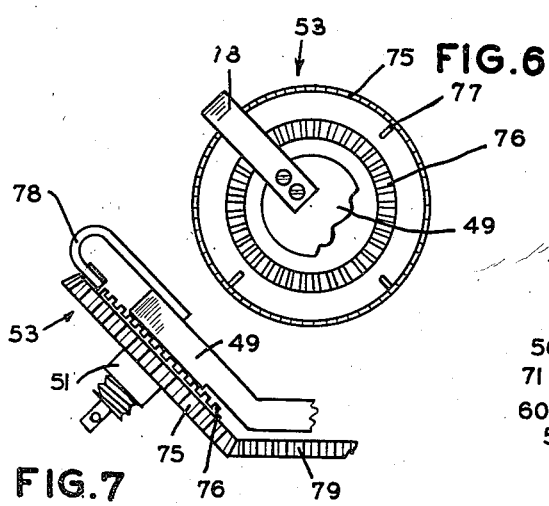
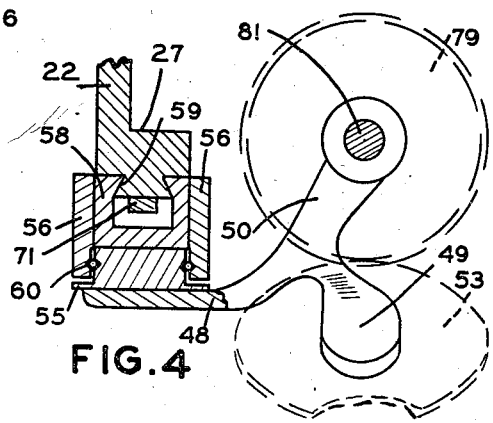
EDWARD F. FLINT
INVENTOR
ATTORNEYS Dec. 2, 1941.  E. F. FLINT  2,264,835
MICROSCOPE
Filed July 30, 1940  3 Sheets-Sheet 3
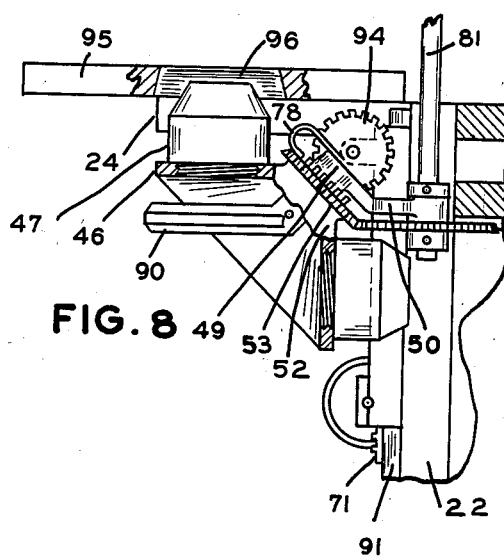
FIG. 8
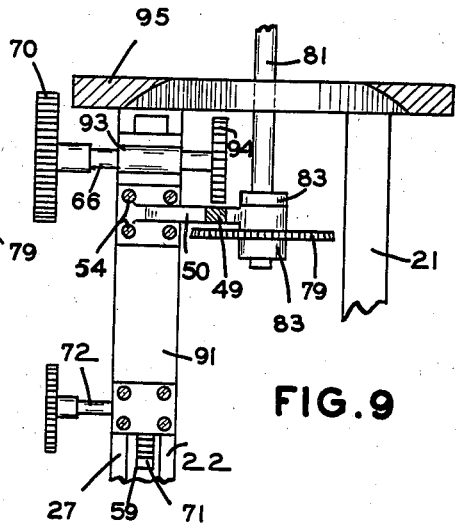
FIG. 9
FIG. 10
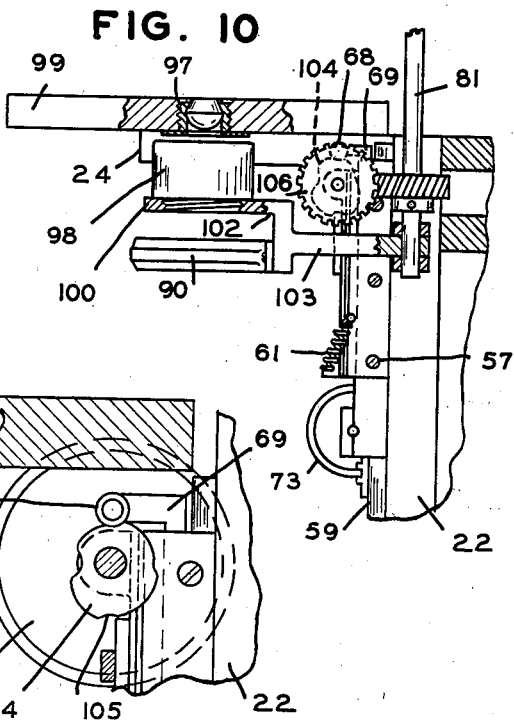
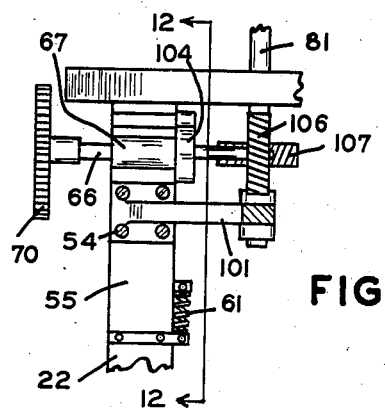
FIG. 11
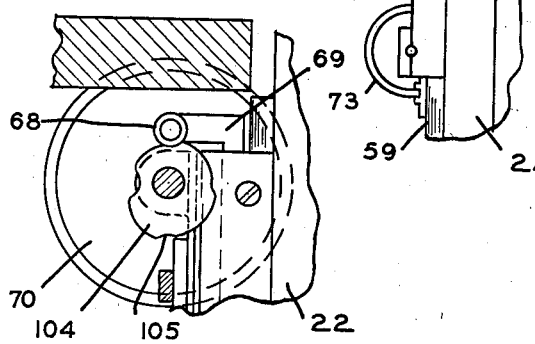
FIG. 12
EDWARD F. FLINT
INVENTOR
BY
ATTORNEYS Patented Dec. 2, 1941

2,264,835

UNITED STATES PATENT OFFICE 2,264,835

MICROSCOPE

Edward F. Flint, Brighton, N. Y., assignor to Bausch & Lomb Optical Company, Rochester, N. Y., a corporation of New York.

Application July 30, 1940, Serial No. 348,455

10 Claims. (Cl. 88—39)

The invention relates to optical instruments and more particularly has reference to microscopes and the objective lens means and condenser lens means associated with such devices.

It is hence a major object of my invention to provide an improved microscope in which objective lens means and condenser lens means are mounted for adjustment into different operative positions with respect to each other and wherein actuating means are utilized for simultaneously positioning the objective and condenser lens means in such operative positions.

An equally important object of my invention is to provide an improved microscope which combines the advantages of a construction permitting the use of adjustable objective and condenser lens means with a microscope design which allows facile and convenient manipulation and adjustment of the instrument as well as ready access to the working parts thereof.

Another object of the invention is the provision of a microscope having rotatable objective and condenser holders, each carrying a plurality of lenses respectively arranged in paired relation to each other, together with means for rotating these holders so as to simultaneously position an objective and a condenser in operative relation with respect to each other.

Still another object of my invention resides in the provision of a microscope having rotatably mounted objective and condenser lens holders, the condenser lens holder also being slidably mounted, together with means for slidably moving the condenser holder and for rotating both holders so as to position one of a plurality of objectives carried by the objective holder and a cooperating condenser of a plurality of condensers carried by the condenser holder in operative relation with respect to each other.

A still further object of my invention is to employ with a microscope, a plurality of movable objectives and cooperating condenser lens means therefor, the condenser lens means consisting of a fixedly mounted front lens separated from a slidably mounted back lens, means being provided for simultaneously moving the objectives and the back lens into different operative positions.

With these and other objects in view, which may be incident to my improvements, the invention consists in the parts and combinations to be hereinafter set forth and claimed, with the understanding that the several necessary elements comprising my invention may be varied in construction, proportion and arrangement without departing from the spirit of the invention or the scope of the appended claims.

Objectives of different optical characteristics are frequently used in a microscope where, for example, it is desired to view an object under different degrees of magnification or to change from bright to dark field illumination. Generally speaking, except in low power magnification, it is necessary to employ a condenser to properly illuminate the object under observation. The condenser also illuminates the back lens of the objective. Theoretically, a condenser perfectly suited for use with a particular objective will transmit a cone of light which will just completely fill the back lens of the objective. Hence, where a condenser is employed it is desirable to use one which will at least allow an approximate satisfaction of this requirement. Usually different condensers of different characteristics are employed with different objectives so that objectives and condensers are supplied in matched pairs.

Customary construction practice for microscopes employs a revolving or rotating nosepiece or objective lens holder carrying a plurality of objectives. However, practical design intended as far as possible to provide facile and simple adjustment for the instrument, has heretofore utilized a vertically slidable condenser holder which is capable of carrying only a single condenser. With such construction a change of objectives is easily made by merely rotating the objective holder until the desired objective is in operative position. On the other hand, the changing of a particular condenser for one more suitable is a complicated and tedious task. For example, to change a condenser it is necessary to "rack down" the lens holder thereof, remove the condenser, insert and seat a new condenser and then "rack up" the condenser holder to move the new condenser into operative position. Not only is it tedious to change a condenser under such circumstances, which change necessitates an interruption of examination of an object, but there is also involved a considerable time element loss in effecting the change.

The present invention proposes to overcome these disadvantages by mounting objective lens means and condenser lens means in adjustable or variable cooperation with respect to each other and as one manner of practically effecting its concept makes use of a rotatably mounted objective lens holder and a rotatably mounted condenser lens holder which respectively carry a plurality of different objectives and a plurality of different objectives in paired relation to each other. Actuating means are provided for rotating the objective holder and moving an objective into operative position. Where, due to the construction of the microscope stage, it is necessary to lower the condenser holder clear of the stage before it can be rotated, the construction expedient of mounting the condenser holder on the outer slide member of a double slide carried by the microscope stand is utilized. The inner slide member of this slide is elevated by the usual rack and pinion used in lowering and raising a condenser and both slide members are moved together on actuation of the inner slide member. However, the outer slide, which carries the condenser holder, is independently movable of the inner slide member and is moved by actuating means which also rotates the condenser holder to move each condenser into operative relation to its respective objective. In order that the objectives and the condensers may be simultaneously moved into each operative position, the inventions provide coupling means for interconnecting the actuating means for each lens holder. Use of a clutch interposed in the coupling means is also contemplated by my invention so as to permit, when desired, independent actuation or movement of the lens holders with respect to each other.

The invention likewise includes as a means for effecting its concept the use of a modified stage having a stage opening of such size and shape as to permit the rotation of a condenser holder without the necessity of lowering it to clear the stage while a further modification for the successful practice of the invention comprehends the substitution of a single condenser for the plurality of condensers carried by a condenser holder as heretofore described. The single condenser employed in this latter modification comprises a movable back lens separated from a fixed front lens, the back lens being moved into predetermined positions with respect to the front lens for cooperation with each of the objectives carried by the objective holder so as to provide an effective condenser therefor.

In order to make my invention more clearly understood, I have shown in the accompanying drawings means for carrying the same into practical effect without limiting the improvements in their useful applications which for the purpose of explanation have been made the subject of illustration.

In the drawings:

Figure 3 is a partial sectional view taken along the line 3—3 of Figure 2 showing further details of the vertical adjusting mechanism for the condenser lens holder.

Figure 4 is a broken away horizontal section on the line 4—4 of Figure 2 and discloses the slidable mounting of the condenser holder.

Figure 5 is a partial back elevation of the microscope shown in Figure 1.

Figure 6 is a partial side elevation of the support arm for the condenser lens holder and shows a part of the actuating gearing associated with the holder.

Figure 7 is a partial plan view of Figure 6.

Figure 8 illustrates a modification of the invention applied to a microscope like that of Figure 1 and shows a partial side elevation of such an instrument, disclosing in detail the stage construction and substage condenser changing mechanism.

Figure 9 is a partial front elevation of the microscope disclosed in Figure 8.

Figure 10 shows a partial front elevation of a microscope similar to that illustrated in Figure 1 having still another form of the invention associated therewith, this view disclosing in detail the use of a condenser having a fixed front lens and a separate movable back lens together with the mechanism for positioning the back lens.

Figure 11 is a partial front elevation of the microscope disclosed in Figure 10.

Figure 12 is a partial sectional elevation taken on the line 12—12 of Figure 11.

Figure 1:
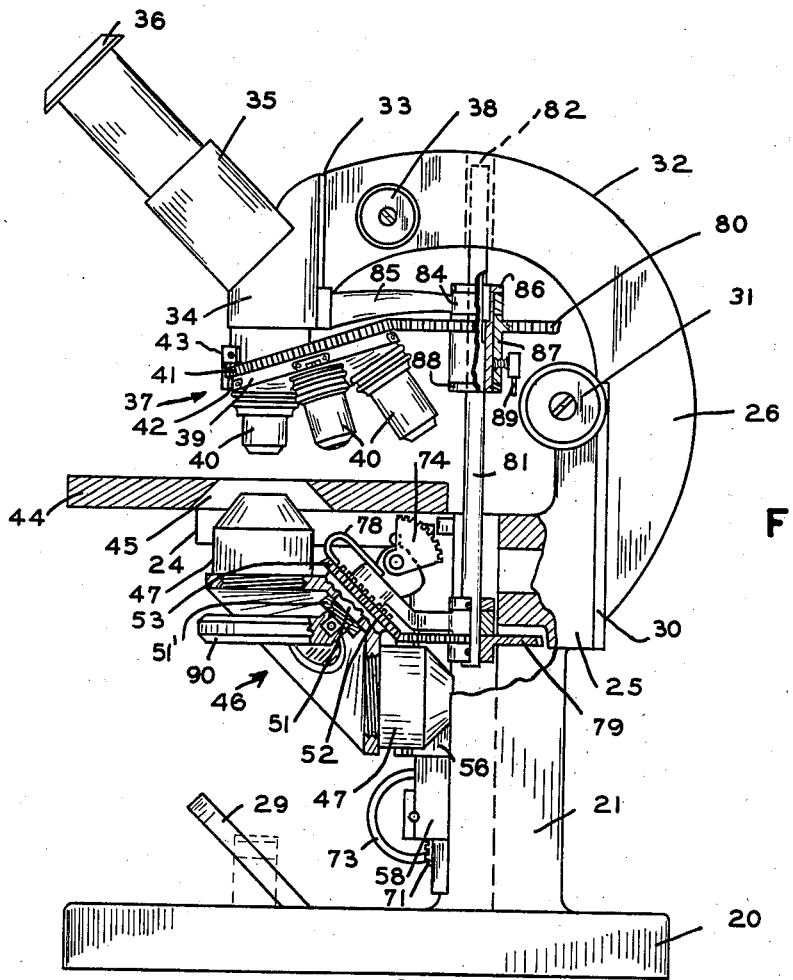
Figure 1 is a broken away side elevation of a microscope illustrating one form of embodiment of my invention.

In the drawings, wherein like reference numerals designate like parts, there is illustrated in Figures 1 through 7 one embodiment of my invention. Therein shown, is a microscope having a stand formed of a base 20 from which rises spaced apart vertical pillars 21 and 22 which are united at their upper ends by a cross piece 23 from which extends horizontal arms 24 forming the stage support and also the vertical bracket or slide 25 employed to support the arm 26 carrying the ocular and objective system of the microscope. Generally the stand for the instrument is made of one integral casting although it will be obvious that the various elements forming it may be separately constructed and then assembled.

To be noted is the fact that the pillars are similar in cross section to structural angles having unequal legs, the longer leg of each pedestal being parallel to the side of the base. It may also be observed that the short leg 27 of pillar 22 is of greater length than the short leg of the pillar 21 so that the condenser system of the instrument may be supported from the former. The stand, it will be appreciated, with its pillars of structural angle cross section which are tied together at their upper ends, affords a strong yet light weight construction well adapted to rigidly support and maintain the relatively heavy elements comprising the ocular body, objectives, condensers, and the stage of the instrument in their proper alignment.

Another important feature of this construction resides in the spacing apart of the pillars 21 and 22 to permit the instrument to be illuminated from its rear, which in Figure 1 is located on the right side, by allowing light rays to pass between them so as to strike the pivoted and rearwardly positioned mirror 29 carried by the base and then to be reflected into a condenser lens. By such expedient, the stage and ocular body may be arranged on the front of the stand adjacent to the user of the microscope while an objective lens holder for a plurality of objectives may be so mounted that its objectives not in use are pointed toward the rear of the stand and are in out of the way positions. Obviously this arrangement provides free and unobstructed access to the stage while at the same time it allows the manually operated knobs for actuating the movable and adjustable parts of the microscope to be located at convenient positions which facilitate the focusing and adjustment of the instrument.

As may be observed in Figures 1 and 5, the bracket 25 is provided with a slide guide 30 within which is slidably mounted the arm 26 which carries the optical observation parts of the microscope. Vertical adjustment of the arm 26 is obtained through the usual rack and pinion construction (not shown in the drawings) operated by the knurled knob 31 on the end of the shaft which carries the actuating pinion. In this manner, coarse adjustment means are provided for the ocular body and objectives of the instrument.

From the bracket 25 the arm 26 rises upwardly and then curves forwardly as indicated at 32 and is provided at its end with a slide guide 33 in which is slidably mounted the ocular body 34. The body 34 supports the one or more oculars 35 each having an eyepiece 36 and the body also carries the revolving nosepiece or objective lens holder 37. Suitable gear mechanism, actuated by the knurled knob 38, is carried in the end of the arm 26 for vertically adjusting the ocular, and nosepiece. This mechanism, which is of any conventional type, is employed to effect the fine adjustment for the observation parts of the microscope.

Revolving objective holder 37 which is of the usual type of construction is secured to the end of the body tube in any conventional manner. In this instance, however, the outer revolving spherical plate 39 of the objective holder carries seats for four different detachable objectives 40. These objectives are so positioned that they form a 90° angle with each other so that they are separated by an arc of 90°. Also mounted upon the revolving plate 39 so as to revolve with it, is a gear 41. This gear, which is employed to rotate the nosepiece, is located upon the upper surface of the plate 39 adjacent the end of the body tube. A suitable catch 42 is provided on the edge of the plate 39 opposite each objective. Each catch is adapted to be frictionally engaged by the latch 43 carried upon the end of the body tube 34 and provides means for maintaining each objective in centered relation to the stage aperture and substage condenser when the objective is in operative position.

Generally the microscope is of the binocular type although it will be well appreciated that a design employing a monocular eyepiece may be employed if desired. Also it will be realized that well within the scope of the invention is the provision for altering the instrument, at will, for either binocular or monocular observation.

As already pointed out the changing of a condenser is extremely tedious, time taking and bothersome. Obviously it would seem a simple matter to overcome this difficulty by mounting a plurality of condensers in a revolving lens holder similar to that employed for an objective nosepiece so as to allow change of condensers by mere rotation of the holder. However, such practice would fail to eliminate the necessity of racking down the condenser holder in order to carry out such a change. This is due to the fact that a condenser must be very close to the object undergoing observation and for that reason under present microscope construction extends within an opening in the microscope stage, such as that provided in the stage 44 and indicated by the reference numeral 45 in Figure 1. Under such a condition it will at once be realized that it would be impossible to rotate a condenser holder without first lowering it clear of the stage opening.

As one manner of obviating the necessity of racking down the condenser mounting when it is desired to shift to a different condenser, use is made of the construction shown in Figures 1 through 5 of the drawings. In this construction a condenser lens holder 46, somewhat similar in design to the nosepiece 37, is employed to carry four condensers 47. To simplify the drawings only two condensers have been shown. Each condenser is detachably mounted, in any convenient manner, in suitable seats provided in the condenser holder 46, these seats being centered at 90 arcuate degrees from each other. Condenser holder 46 is in the shape of a frustum of a right circular cone whose vertex would lie towards the rear of the instrument or to the right as shown in Figure 1. To be noted is the fact that the holder 46 is mounted for rotation about its axis which passes through the center of its base and the vertex of the cone forming it. The condenser holder is located so that its axis makes an angle of approximately 45° with and to the left of the vertical and below the horizontal as viewed in Figure 1. In other words holder 46 is mounted for rotation on an axis which slopes upwardly from the front to the rear of the microscope.

Use is made of an arm 48 for rotatably supporting the nosepiece 46. Arm 48 has branches 49 and 50, the latter being horizontally disposed and the former being inclined thereto at an angle of approximately 45°. The branch 49 of the arm 48 is provided with a stub shaft 51 for mounting the conical condenser holder thereon. As may be noted the cone forming the lens holder 46 is provided with a solid face 52 opposite its base. By providing a suitable opening in the face 52, the lens mount may be slipped over the shaft 51 and held thereon for free rotation with respect to the shaft by any conventional means, such as the nut 51'. Secured to the upper surface of the face 52 so as to rotate with the lens mount is the condenser changer gear 53, the purpose of which as well as that of the branch 50 of the arm 48 will hereinafter appear.

Figure 2:
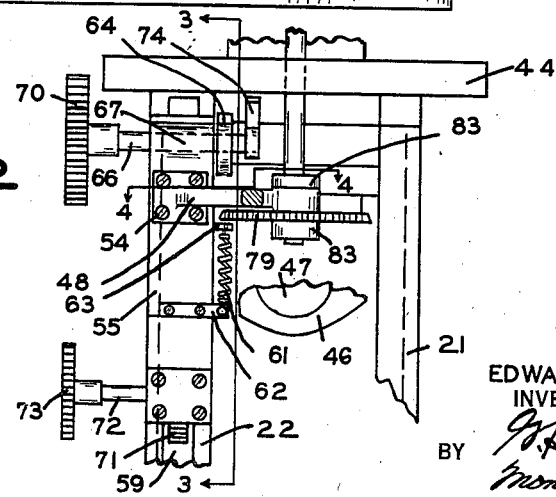
Figure 2 is a partial front elevation of the microscope of Figure 1 showing the condenser changing mechanism in partial detail.

As may be best observed from an inspection of Figures 2, 3 and 4, the arm 48 carrying the revolving condenser holder is fixedly connected by screws 54 to an outer slide 55 carried between guides 56 which latter are secured by screws 57 to a second and inner slide 58 carried on the guide 59 formed upon the leg 27 of the pillar 22. Runways for ball bearings 60 are provided in the slide 55 and the guides 56 so that the former may be moved with great ease. This construction permits the outer slide 55 to be moved in its guides independently of movement of the inner slide 58 and consequently allows similar movement of the condenser nosepiece connected to it. Moreover, by the use of means, to be just hereinafter described, which permit the selective coupling of the outer and inner slides, it will be readily appreciated that the condenser holder may also be raised or lowered by movement of the inner slide 58.

Actuating mechanism for moving the outer slide and for simultaneously moving the two slides is particularly well shown in Figures 1 through 4 and includes a spring 61 connected at one end to a bracket 62 carried on the slide 55 and at its other end to a bracket 63 carried by the guide 56. With this construction downward movement of the slide 55 in its guides is against the action of the spring 61 which is designed to maintain the outer slide in its upper elevated position shown in Figure 3 and also to maintain the working surface of a cam 64, supported by the outer slide, in firm bearing contact with a roller 65 supported from the inner slide 58. Cam 64, which is designed on a constant velocity curve, is fixed on a shaft 66 mounted for rotation in a bearing 67 provided upon the outer face of the slide 55 while the roller 65 is mounted for free rotation upon a stub shaft 68 carried upon an arm or bracket 69 suitably connected to the inner slide 58. The shaft 66 extends to the side of the instrument and is provided with a knob or wheel 70 for actuating the cam 64.

For movement of the inner slide, use is made of a rack 71 formed upon the guide 59 and a suitable cooperating pinion (not shown) carried on shaft 72 supported by the slide 58 and guides 56. The shaft 72 is provided with the usual operating wheel indicated by the reference numeral 73.

Assuming that the outer slide is in the position shown in Figure 3, it will be appreciated that rotation of the knob 70 in either direction will cause the cam 64 to depress the outer slide 55, this downward movement of the slide continuing until the cam has been turned 180° at which location the highest point on the cam surface is in contact with the roller 65. This downward movement of the outer slide has been against the action of the spring 61. Continued rotation of the cam in the same direction to complete a full revolution will return the low point of the cam to contact with the roller. As this occurs the tension on the spring is reduced so that the spring contracts and returns or lifts the slide vertically to the position shown in Figure 3. Obviously since the condenser mounting is carried with the slide it is moved in accordance with movements of the slide.

The length of movement for the slide is, of course, determined by the size of the cam, and by reason of the particular construction employed may be obtained independently of any movement of the inner slide. When the outer slide is in its normal position for holding the condenser mount at the proper location for use of the microscope there is sufficient tension in the spring 61 to maintain the slide in this elevated position, as well as to couple the outer slide to the inner slide 58 so that the former will be carried or moved together with the inner slide upon actuation of the latter by the rack and pinion mechanism. Thus it may be observed that through the use of a double slide not only am I able to lower a condenser mount a sufficient distance below the stage to effect a change of condensers without use of the rack and pinion mechanism but I am also able to obtain the advantages to be derived from the use of such mechanism by actually retaining it and combining its use with means for independently moving the condenser mount.

While the foregoing construction affords means for lowering and raising the condenser holder, it will be realized that in order to shift condensers, the holder must be rotated when the objectives are clear of the stage. The actuating means for accomplishing this is put into operation with the lowering of the condenser holder and comprises the gear 53, fixed to the upper face of the condenser holder as already described, and the sector gear 74 secured upon the end of shaft 66 carrying the cam 64. Gear 53 is provided with a driving gear element 75 upon its periphery, the purpose of which will be hereinafter explained, and with a driven gear element 76 located upon its upper face.

The gear 74 may be formed of a 90° sector and may be designed with the same gear ratio as the gear element 76. Where such is the case, each complete revolution of the gear 74 will rotate the gear element 76 and hence the condenser holder through a quarter of a revolution or the exact distance between centers of the lens seats. Since the shaft 66 carries both the cam 64 and the sector gear 74, it will be apparent that a complete rotation of the shaft in either direction through means of the hand knob 70 will successfully effect a change from one condenser to another by causing the condenser holder to be lowered, rotated and raised to its normal operating position so that the changed condenser will be centered with respect to the stage opening and also with respect to its cooperating objective. Obviously the sector gear can be secured upon its shaft at such position that its engagement with the gear element 76 will occur only when the condensers are in clearance with regard to the stage. As one means of positively retaining each condenser in its centered and operative position, I make use of four centering stops 77, one for each condenser, located outside of element 76 at 90° apart from each other. Each of these is adapted to engage the fixed spring detent 78 carried upon the branch 49 of the arm 48 as its condenser is rotated into operating position.

In the foregoing I have described the mechanism for shifting from one condenser to another. Such a shift is usually caused by a change of objectives. As already noted the objective holder is rotatably mounted, so that to change an objective it is only necessary to revolve the holder until the desired objective is moved into operative position. The actuating means for changing an objective includes the gear 80 which drives the gear 41 on the objective nosepiece. Gear 80 is mounted on a shaft 81, the upper end of which shaft is suitably journalled in the arm 26 as indicated at 82 and the lower end of which is fixedly connected by collars 83 to a shaft support on the end of branch 50 of the branched arm 48.

An important feature of the invention resides in the simultaneous shifting of a condenser and an objective. To accomplish this the actuating means for causing such a change are suitably coupled to each other and to this end the condenser gear 53 is provided with the gear element 75 which meshes with a gear 79 carried on the lower end of the shaft 80. Obviously through such a connection, rotation of the condenser holder results in driving shaft 81 and its gears 79 and 80 which latter gear will actuate the objective holder. Where desired the lower collar 83 for supporting the shaft 81 may be formed integrally with the gear 79.

In further detail of gear 80 and its mounting it should be noted that near its upper end, the shaft 81 is supported in a bearing 84 provided upon the end of arm 85 which extends from the ocular body 34. A sleeve 86 having a suitable supporting flange at its upper end is carried by the bearing 84. This sleeve is splined to the shaft 81 as shown in the drawings so that while it is fixed thereto for rotation with the shaft, lengthwise movement of the latter is permitted. Gear 80 which is provided with an elongated shank 87 is freely rotatable on the sleeve 86 and is held thereon by a retaining ring 88 secured to the sleeve in any well known manner. In order to couple the gear 80 to the sleeve so that it will rotate with the shaft 81 use is made of an adjustable screw threaded clutch member 89 which is threaded into the wall of the shank 87 so that inward movement of the clutch will lock the shank and the gear 80 to the sleeve 86.

The operation of the invention disclosed in Figures 1 through 7 will be apparent when it is kept in mind that the shaft 81 is journalled in the arm 26 and that its lower end is carried by the branch 50 of the slidably mounted and branched arm 48 which supports the condenser holder. By such construction the arm 26 and the ocular body 34 may be moved independently of the shaft 81 upon actuation of the coarse or fine adjustment mechanism of the microscope to vertically move either of these parts, while the shaft 81 itself may be moved independently of the arm 26, ocular body 34 and gear 80 on operation of either the knob 70 or the knob 73 to cause vertical movement of the condenser holder.

Assuming that the elements of the instruments are in the positions shown in Figure 1 and that the gear 80 is clutched to the shaft 81, it will be appreciated that rotation of hand knob 70 will cause actuation of the condenser changer means by rotating the shaft 66 supported on the outer slide 55 and consequently the cam 64 fixed to shaft 66. Rotating contact of the cam with the roller 65 carried by the relatively stationary inner slide 58 causes the outer slide 55 to be forced downwardly. This downward movement of the slide will also cause downward movement of the condenser holder carried on the branch 49 and the shaft 81 carried on the branch 50 of the branched arm 48 supported by the outer slide. Continued rotation of the knob 70 brings the sector gear 74, also carried by the shaft 66, into engagement with gear 53 to cause its rotation and hence rotation of the condenser holder so as to move a new condenser into operative position.

The actuating means just described for moving the condenser holder is coupled to the actuating means for moving the objective holder or the gear 80 by suitable coupling means so that movement of the condenser and objective holders may be effected simultaneously. These coupling means, which comprise gear 53 meshing with gear 79 and its supporting shaft 81 which also carries the objective changer gear 80, will cause the objective holder to be rotated an amount equal to that of the condenser holder or by reason of the size of the sector gear 74 which drives the gear 53 will rotate the objective holder through an arc of 90°. As this is the distance between centers of objectives and centers of condensers it will be well understood that a new objective and a new condenser will be moved into centered alignment with each other and will be maintained in such positions by the centering stops at the objective and the condenser lens holders.

The condenser lens holder is moved to its lower position before sector gear 74 engages with gear 53. By reason of the shape of the cam, the condenser holder is held in a fixed vertical position during its rotation. When sector 74 disengages from gear 53, vertical ascent of the holder is commenced. During its downward travel, the condenser lens holder is working against the tension of the spring 61 so that when the cam has reached a position where it has ceased to force the outer slide 55 downwardly, the released force in the spring will elevate the slide and the condenser lens holder as the cam continues its rotation to a position like that shown in Figures 1 and 3. At such latter position it will be apparent that the new and changed condenser has been raised to its proper working location beneath the stage where it is maintained by reason of the tension still remaining in the spring 61.

In the construction shown it is obvious that the wheel 70 may be turned in either a clock or a counterclock direction to effect an objective and condenser change. Where it is desired to shift to an objective and a condenser 180° removed from the working objective and working condenser, as for example the objective and the condenser farthest to the right in Figure 1, two complete revolutions of the operating knob 70 are made. The condensers and the objectives are arranged in matched pairs and obviously are originally placed in their lens holders in their paired relation so that actuation of the heretofore described shifting mechanism will move any desired matched pair into operative relation with respect to each other.

Under circumstances requiring the employment of an objective which is unmatched with respect to any condenser being used with the instrument or where a condenser unmatched with any objective is employed, it is desirable to permit the independent changing of objectives and condensers. Where such is the case, clutch member 89 is backed off from engagement with sleeve 86 so as to allow the shaft 81 and the gear 80 to rotate independently of each other. With the clutch in the uncoupled position operation of the knob 70 will cause a change of condensers in the manner already described while an objective may be shifted by either rotating gear 80 or the objective holder itself by hand. Reclutching of the clutch member will, of course, condition the instrument for simultaneously shifting the condensers and objectives.

It has been pointed out that certain important advantages are derived in the use of a stand employing a split support of two pillars and also by using elements of special structural shapes for the construction of the stand. These advantages reside chiefly in the provision of a construction which affords ready access, easy manipulation and adjustment as well as the rigid support of all parts of the microscope. To be noted is the fact that none of these advantages are lost or sacrificed by the mechanisms which permit the changing of objectives and condensers. This is true since all of the working parts of the changing mechanisms are located in out of the way positions under and to the rear of the stage and to the rear of the objective holder while the actuating elements for each mechanism is positioned at convenient and readily accessible locations. Such arrangement is primarily allowed by reason of the angular mounting of the condenser holder. Positioning the condenser holder so that its vertex is located towards the rear of the instrument permits driving connection with the objective changer shaft from the rear and the consequent location of the shaft at the back of the stage in a centrally disposed relation thereto.

It will be further appreciated that by mounting the condenser holder in the manner disclosed I provide a ready means for supporting any of the usual substage devices employed with a microscope at a convenient location. As shown in Figure 1, the support shaft 51 for the condenser holder is formed with an extension portion to which is secured, as for example by a key or pin, the connection arm of a filter or diaphragm 90.

I have indicated that one difficulty encountered in changing condensers resides in the necessity of lowering the condenser holder to make such a change and I have disclosed in Figures 1 through 7 one practical manner of overcoming this. With the rotatable condenser mount which I have disclosed, it will be realized that if the stage opening for the condenser is suitably enlarged, a change of condensers could be made without the necessity of lowering the condenser lens holder.

A modified form of my invention which employs the construction practice just outlined is illustrated in Figures 8 and 9 wherein reference numerals like those used in Figures 1 through 7 are used to designate unchanged parts. As therein shown, the construction differs from Figures 1 through 7 in the stage design, the drive means for the condenser holder and the vertical slide used for vertical adjustment of the condenser holder. The latter is of the usual single slide type and consists of the slide 91 which is slidably joined through a dove tail point to a guide 59 formed on the short leg of the pillar 22. Vertical adjustment of slide 91 is effected by rack 71 and a suitable pinion carried by the shaft 72 which latter is rotatably mounted upon the face of the slide 91 in the usual manner. It is the slide 91 which is here employed to support the condenser holder and the condenser and objective changer mechanism.

As may be observed in Figures 8 and 9, the slide 91 has attached to it the same type of supporting arm 48 as that shown in Figures 1 through 7, this arm being provided with branch 50 supporting the gear 79 and shaft 81 in the manner heretofore described and with the arm 49 supporting the quadruple condenser holder 46 and condenser changer gear carried by it in a manner like that already described.

The condenser holder support and means for rotating the condenser holder differ from the design shown in Figures 1 through 7 in that the condenser holder may only be moved vertically upon actuating the rack and pinion to cause movement of the single slide. Thus the depressing cam is eliminated and the rotating mechanism is formed only of a bearing 93 on the face of the slide 91 which rotatably supports shaft 66 carrying operating knob 70 and full gear 94 in place of the sector gear heretofore employed for rotating the condenser holder. Gear 94 engages the upper teeth on the condenser changer gear and effects rotation of the latter in either direction upon actuation of the operating knob 70.

In Figures 8 and 9 it may be noted that as is usual, the conical upper end of a condenser when it is in working position is recessed within the stage opening. Its change for another condenser carried by the condenser holder is allowed by a novel construction for the stage which makes it possible to rotate the condenser holder without the necessity of lowering it. For this purpose I employ a stage 95 provided with an enlarged opening 96 in which each condenser is recessed when in its working position and through which the condensers may be moved as they are shifted from one position to another. In plan, this opening has an oval shaped contour while its transverse and longitudinal sections approximate an isosceles trapezoid in appearance. It should be noted that the lower length dimension of the stage opening is considerably greater than its upper length dimension, while the width dimensions of the opening may be substantially equal. By suitably choosing the dimensions for a stage opening such as that described, it will be appreciated that the curved path of travel of the condensers through the plane of the stage may be totally included within the opening. Obviously by this means interfering contact of the condensers with the stage is avoided and a condenser change may be made without having to lower the condenser holder.

The condenser lens holder disclosed in Figure 8 is designated to seat four condensers 47 at 90° distance from center to center. Hence a quarter revolution of the gear 94 will cause a condenser change, the newly located condenser being releasably held in its working position by the spring pressed detent and catch shown in the drawing. At the same time that the condenser holder is rotated, the shaft 81 is driven through the condenser gearing and gear 79, this rotation being transmitted to a rotatable objective holder, similar to the holder 37, by means like those already described and shown in connection with Figures 1 through 7. A suitable clutch may be used for coupling together the shaft 81 and its objective holder gear to permit independent changing of condensers and objectives. In the construction of Figures 8 and 9 the upper end of the shaft 81 is journalled in the arm of the microscope which supports the ocular and objective system and is keyed to its objective changer gear so that the shaft may be vertically moved when it is desired to change the vertical position of the condenser holder through actuation of the adjusting rack and pinion. A substitution of one or more condensers differing from those normally carried by the condenser holder may be made in the usual manner on racking down the holder.

The operation of a condenser and objective changer of the type described in connection with Figures 8 and 9 is substantially similar to that of the form disclosed in Figures 1 through 7 and will be well understood. Moreover it will be appreciated that the modified form of construction making use of the enlarged stage opening may be employed with any type of stage. However, practical application of an enlarged stage opening due to its effect on the stage area is limited to use with the conventional flat top stage and with the mechanical stage.

In the forms of the invention heretofore described, the problem of correctly illuminating the back lens of each of the objectives has been overcome by utilizing with each objective a special condenser whose aperture is such that it will project a cone of light which will, at least in theory, exactly fill the back lens of its objective. I have shown in Figures 10 through 12 however, a means for approximating this condition by the use of one condenser for several objectives each having different optical characteristics and different apertures. To accomplish this, I employ a condenser whose lenses are adjustable with respect to each other so as to allow variation in the focal length of the condenser with consequent variation of its aperture size or of the angle of the light cone which it projects.

With particular consideration to Figures 10 through 12, wherein parts and elements like those disclosed in previously described views of the drawings are indicated by like reference characters, it may be observed that I make use of a variable focus condenser consisting of the separated front and back lenses, respectively, carried in lens mounts 97 and 98. The former is fixedly held, as for example by the threaded fastening means disclosed, within an opening in the stage 99 so that its upper surface is a little below the upper surface of the stage. Lens mount 98 is provided with the usual threaded flange for fastening it within a seat provided in a vertically adjustable lens holder 100.

The lens seat 100 is in this instance formed integral with one of the branches 102 of an arm 101 similar to the support arm 48 disclosed in detail in Figure 4, the second branch 103 of arm 101 being employed to support the objective changer shaft 81. It is through the use of a slide construction similar to that of Figures 1 through 7 that vertical adjustment is obtained for the back lens of the condenser. To this end the arm 101 is fixed to the front slide 55, which as already described may be moved independently of or with the inner slide of the substage mechanism, the inner slide being connected to the inner guide 59 on the front leg of the pillar 22 of the instrument.

Movement of the inner slide is effected by the usual rack and pinion actuated by the operating knob 73 while movement of the outer slide is controlled by a special cam 104 rotated by shaft 66 carried in bearing 67 on the outer face of the outer slide 55. As in the case of the construction disclosed in Figures 1 through 7, the cam is designed for constant bearing contact with the roller 68 carried by the bracket 69 on the inner slide and is maintained in such contact by the spring 61. Hence rotation of the cam for a complete revolution will result in forcing the outer slide downwardly against the action of the spring 61 and then as the cam reaches the end of its thrust against the roller 68 will result in the energy of the spring being utilized to lift the slide to its former elevated position as the revolution is completed.

By providing a suitable shape for the cam 104, it will be appreciated that it can be made to position the back lens 98 at any desired number of different distances from the front lens 97 so that the field and aperture of the one condenser may be varied as desired to roughly fulfill the illumination requirements for several different objectives. The condenser shown in Figures 10 through 12 has been designed for use with an objective holder carrying four objectives such as those heretofore disclosed. For this reason the cam 104 is constructed to position lens 98 at four different positions with respect to the front lens 97, each position being such that a cone of light is produced which approximates that required to fill the back lens of one of the objectives of the nosepiece. At each of these positions the contacting surface of cam 104 is provided with a slight depression 105 which serves as a retaining stop for maintaining the back lens in such position.

The objective holder or nosepiece used with the microscope of Figures 10 through 12 is rotated in a manner similar to that described in connection with the form of the invention illustrated in Figures 1 through 4. To this end the branch 103 of the support arm fixedly carries the rotatable objective changer drive shaft 81, which shaft is journalled in the arm 26 of the microscope in the manner shown in Figure 1. As the variable focus condenser is not rotated a simplified drive means, comprising the gear 106 on the end of shaft 66 and the cooperating gear 107 on the objective changer shaft, may be employed for simultaneously effecting a change of objectives with a change in the position of the lens 98 of the condenser or with what amounts to a change of condensers.

Obviously the operation of the form of the invention illustrated in Figures 10 through 12 is similar to that of the forms already described. On raising or lowering the back lens 98 of the condenser, by actuation of the operating knob 70, the shaft 81 is driven to rotate the nosepiece of the microscope and move into operative position an objective of an aperture corresponding to that approximated by the condenser as a result of the new position for its back lens. As the condenser lens 98 is lowered, due to the fact that the focus of the condenser is changed there will be an increase in the width of the field illuminated by the condenser. Hence roughly speaking the effect of using a condenser of greater aperture has been obtained, the size of the aperture being determined by the distance separating the front and back lenses of the condenser. Use in this form of the invention is also made of a clutch or other means like that heretofore disclosed for coupling the objective changer shaft to the nosepiece so that simultaneous rotation of the latter with the shifting of the lens 98 may be made dependent upon the will of the worker. Of course this independent or simultaneous adjustment of the condenser and objective systems grants the advantages heretofore outlined for such practice.

While in the various modifications of the invention I have disclosed the use of a holder for four objectives and a holder for four condensers or in the case of the variable focus condenser, means for automatically positioning the back lens of the latter at four particular locations, it will be well understood by those skilled in the art that I am in no wise limited to the use of this number of objectives and condensers or the equivalent of the latter. Obviously by suitably changing the gearing and the cam surfaces employed in the changing mechanisms, the number of the elements just mentioned or the number of particular selective settings for the back lens of a condenser may be varied at will within the limits of practical design.

From the foregoing it will be appreciated that without sacrificing ease and convenience of manipulation and adjustment of the instrument, I have provided a simple design permitting the simultaneous changing of objectives and condensers to meet different observation conditions, means also being disclosed for allowing a condenser and objective change to be made independently of each other. It will also be realized that in attaining the objects of my invention I have, by the provision of an open stand, made full use of the advantages to be derived by illuminating a microscope from the rear of its stand. At the same time, I have disclosed a strong and rigid construction capable of supporting and maintaining the various elements of the instrument in proper optical alignment.

While I have shown and described the preferred embodiment of my invention, I wish it to be understood that I do not confine myself to the precise details of construction herein set forth, by way of illustration, for it will be apparent that many changes and variations may be made therein, by those skilled in the art, without departing from the spirit of the invention or exceeding the scope of the appended claims.

I claim:

1. In a microscope, the combination of a stand, a body carried by the stand, a plurality of objectives movably mounted upon said body, actuating means for moving each of said objectives into operative position, condenser lens means movably mounted upon said stand below said objectives, actuating means for moving said condenser lens means into a plurality of positions to cooperate respectively with said objectives, and coupling means operatively connecting the actuating means for the objectives and for the condenser lens means whereby said objectives and said condenser lens means may be simultaneously moved into each operative position.

2. In a microscope, the combination of a stand, a body carried by the stand, a plurality of objectives movably mounted upon said body, actuating means for moving each of said objectives into operative position, condenser lens means movably mounted upon said stand below said objectives, other actuating means independently operable of said first mentioned actuating means for moving said condenser lens means into a plurality of positions to cooperate respectively with said objectives, coupling means operatively connectable with the actuating means for the objectives and for the condenser lens means whereby said objectives and said condenser lens means may be simultaneously moved into each operative position, said coupling means having a clutch member whereby the actuating means for the objectives and the actuating means for the condenser lens means may be selectively interconnected.

3. In a microscope, the combination of a stand, a curved arm mounted upon said stand, a body slidably mounted upon said arm, a plurality of objectives mounted upon said body, actuating means for moving each of said objectives into operative position, a stage carried on said stand below said body, condenser lens means movably mounted on said stand below said stage, actuating means for moving said condenser lens means into a plurality of positions to cooperate respectively with said objectives, the last mentioned actuating means being located substantially centrally of and below said stage towards the rear of the stand, the actuating means for moving the objectives being located substantially adjacent to said body and within the curve of said arm, and coupling means operatively connecting the actuating means for the objectives and for the condenser lens means whereby said objectives and said condenser lens means may be simultaneously moved into each operative position, said coupling means extending between the actuating means for the objectives and the condenser lens means and located to the rear of the stage.

4. In a microscope having a stand, a body carried by the stand, an objective lens holder rotatably mounted upon said body, a condenser lens holder rotatably mounted upon said stand below said body, the condenser holder being mounted for rotation on an axis sloping upwardly from the front to the rear of the stand, said objective holder and said condenser holder respectively supporting a plurality of objectives and a plurality of condensers arranged in paired relation to each other, actuating means for rotating said objective holder and moving each objective into operative position, actuating means for rotating said condenser holder to move each condenser into operative relation to its respective objective, and coupling means operatively connecting the actuating means for rotating said holders whereby said objectives and said condensers may be simultaneously moved into each operative position.

5. In a microscope having a stand, an arm mounted upon said stand, a body slidably mounted upon said arm, an objective lens holder rotatably mounted upon said body, a support arm slidably mounted upon said stand below said body, a condenser lens holder rotatably mounted upon said support arm, said objective holder and said condenser holder respectively supporting a plurality of objectives and a plurality of condensers arranged in paired relation to each other, said support arm supporting gearing for driving a rotatable shaft movable therewith, said shaft being positioned towards the rear of the stand adjacent the arm carrying said body, gear means on said shaft and said objective holder for rotating said objector holder to move each objective into operative position, actuating mechanism comprising a cam and a spring and other gear means for slidably moving said support arm and for rotating the condenser holder to move each condenser into operative relation to its respective objective, and still other cooperating gear means on said condenser holder and said shaft for driving said shaft whereby said objectives and said condensers may be moved into each operative position.

6. In a microscope having a stand, a body carried by the stand, an objective lens holder rotatably mounted upon said body, a slide member slidably mounted upon said stand below said body, a second slide member mounted upon said first slide in sliding relation thereto, said second slide being independently movable of the first slide but being maintained in fixed relation to the first slide upon movement of the latter, a condenser lens holder rotatably mounted upon said second slide, said objective holder and said condenser holder respectively supporting a plurality of objectives and a plurality of condensers arranged in paired relation to each other, actuating means comprising gear mechanism for rotating said objective holder and moving each objective into operative position, actuating means comprising a cam and a spring and gear mechanism for slidably moving and for rotating said condenser holder to move each condenser into operative relation to its respective objective, coupling means operatively connecting the actuating means for the holders whereby said objectives and said condensers may be moved into each operative position, and actuating means for moving said first mentioned slide member.

7. In a microscope the combination of a stand, an arm mounted upon said stand, a body slidably mounted upon said arm, an objective lens holder rotatably mounted upon said body, a slide member slidably mounted upon said stand below said body, a support arm on said slide member, a condenser lens holder rotatably mounted upon said support arm, said objective holder and said condenser holder respectively supporting a plurality of objectives and a plurality of condensers arranged in paired relation to each other, said support arm supporting gearing for driving a rotatable shaft, the shaft being movable with said arm, gear means on said shaft and said objective holder for rotating said objective holder to move each objective into operative position, gear means for rotating the condenser holder to move each condenser into operative relation to its respective objective, still other gear means on said condenser holder and said shaft whereby said objectives and said condensers may be moved into operative position, and rack and pinion means for slidably moving said slide and its supported condenser holder.

8. In a microscope the combination of a stand, a body carried by said stand, an objective lens holder rotatably mounted upon said body, a condenser comprising a fixedly mounted front lens carried by said stand and a separated back lens, said back lens being slidably mounted upon said stand below the front lens, said objective holder supporting a plurality of objectives each arranged to cooperate with said condenser for a predetermined position of its back lens, actuating means for rotating said objective holder and moving each objective into operative position, actuating means for moving the back lens of said condenser into its operating positions for cooperation with its respective objectives, and coupling means connecting the actuating means for the objective holder with the actuating means for the back lens whereby said objectives and said back lens of the condenser may be simultaneously moved into each operative position.

9. In a microscope having a stand, a body carried by the stand, an objective lens holder rotatably mounted upon said body, a condenser lens holder slidably and rotatably mounted upon said stand below said body, said objective holder and said condenser holder respectively supporting a plurality of objectives and a plurality of condensers arranged in paired relation to each other, gear means carried by said objective holder and said body for rotating said objective holder and moving each objective into operative position, cam and spring means associated with said stand and condenser holder for causing sliding movement of the condenser holder, other gear means carried by said condenser holder and said stand for rotating said condenser holder, said second named gear means and said cam and spring means cooperating with each other to move each condenser into operative position, and coupling means operatively connecting the means for rotating the objective holder and the means for rotating and for slidably moving the condenser holder whereby said objectives and condensers may be simultaneously moved into operative position.

10. In a microscope, the combination of a stand and optical viewing means carried thereon of a condenser lens holder positioned below said optical viewing means, said holder supporting a plurality of condensers each adapted to be selectively positioned in operative relation to said viewing means, a slide member slidably mounted upon said stand below the optical viewing means, a second slide member mounted upon said first slide member in sliding relation thereto, means on said second slide member for rotatably supporting said holder, cam means and spring means associated with said slide members for effecting the sliding movement of the second slide member, gear means carried on said holder, and other gear means carried by the second slide member for driving the first named gear means to cause the rotation of said holder, both of said gear means and said cam and spring means cooperating with each other upon their actuation to move a condenser into operative relation with respect to the optical viewing means.

EDWARD F. FLINT.